Patented Dec. 3, 1940

2,224,026

UNITED STATES PATENT OFFICE 2,224,026

PROCESS OF PRODUCING FATTY ACID MONO-ESTERS OF MONOCHLORHYDRIN

Gerhard Stein, Mannheim, Germany, assignor, by mesne assignments, to General Aniline & Film Corporation, New York, N. Y., a corporation of Delaware No Drawing. Application March 1, 1939, Serial No. 259,109. In Germany March 10, 1938

3 Claims. (Cl. 260—488)

The present invention relates to a new process of producing fatty acid mono-esters of monochlorhydrin.

It is already known that epichlorhydrin can be converted by heating with organic carboxylic acids into esters of monochlorhydrin; unitary compounds are never obtained, however, but always mixtures of mono- and di-esters of monochlorhydrin.

I have now found that fatty acid mono-esters of monochlorhydrin can readily be obtained by reacting aliphatic monocarboxylic acids having at least 4 carbon atoms with epichlorhydrin in the presence of catalysts of the Friedel-Crafts' type.

It is surprising that aliphatic carboxylic acids of high molecular weight, which are frequently less reactive than acetic acids, should, in the presence of the said catalysts, smoothly open the oxide ring of the epichlorhydrin with the formation of esters without the epichlorhydrin, as would have been expected, being polymerized under the influence of the Friedel-Crafts' catalysts.

Among suitable acids for the preparation of the esters there may be mentioned for example butyric acid, valeric acid, caproic acid, oenanthic acid, capric acid, oleic acid, palmitic acid, linoleic acid, stearic acid and their homologues with straight or branched chains. Mixtures of acids may also be used. The carboxylic acid mixtures obtainable by the oxidation of solid paraffins, middle oils and light oils and other aliphatic hydrocarbons of high molecular weight, or fractions or single bodies separated therefrom, which may be purified by the usual methods if desired, are also specially suitable. Among suitable catalysts there may be mentioned in particular aluminum chloride, ferric chloride or boron trifluoride, and their addition compounds, as for example sodium aluminum chloride. The amount of catalyst necessary is usually only a few per cent of the amount of the initial mixture.

For the preparation of the esters it is preferable to proceed by allowing about an equivalent amount of epichlorhydrin to flow or drop into the acid or mixture of acids to which the catalyst is added. The reaction often proceeds at ordinary temperature, but it may be accelerated by heating. Occasionally it is even necessary to cool during the reaction, for example when a very active catalyst, as for example boron trifluoride, is used. It is especially suitable to work at elevated temperature, for example at from about 50° to about 100° C. when it is desired to esterify fatty acids or fatty acid mixtures which are solid at ordinary temperature. Frequently it is also preferable to work in the presence of inert solvents; among such there may be mentioned petroleum ether, ligroin or benzine. In many cases, as for example when boron trifluoride serves as the catalyst, it is preferable to work under pressure.

The catalyst may readily be removed from the reaction mixture by treatment with water or alkaline or acid agents, the crude ester then being either directly further used or purified by distillation, if desired under reduced pressure.

The fatty acid esters of monochlorhydrin are valuable as intermediate products for many technical purposes. For example they may be used for the preparation of mixed fatty acid-mineral acid esters of glycerine.

The following examples will further illustrate how the present invention can be carried out in practice, but the invention is not restricted to these examples. The parts are by weight.

*Example 1*

185 parts of epichlorhydrin are allowed to drop into 288 parts of a mixture of acids having an average carbon atom number of 8 and an acid value of 393 in which 10 parts of anhydrous ferric chloride are suspended, the mixture is allowed to stand for about 30 minutes and is then heated for 5 hours at from 95° to 100° C. 20 parts of sodium acetate are added to decompose the ferric chloride and the whole is then distilled under reduced pressure. After a small first runnings, consisting of epichlorhydrin and unconverted acid, the major portion of the fatty acid mono-ester of mono-chlorhydrin formed is obtained as an oil which distils between 155° and 185° C. under a pressure of 1 millimeter (mercury gauge).

*Example 2*

460 parts of epichlorhydrin are slowly added into a mixture of 500 parts of butyric acid and 25 parts of anhydrous ferric chloride, care being taken by cooling that the temperature of the reaction mixture does not rise above 65° C. After the epichlorhydrin has all been introduced, the whole is allowed to stand for an hour, 30 parts of sodium acetate are added and distillation is effected at a pressure of 10 millimeters (mercury gauge). After a first runnings consisting of butyric acid, the fatty acid mono-ester of monochlorhydrin formed passes over between 120° and 131° C. in an amount of 711 parts.

Example 3

150 parts of benzine and 5 parts of finely powdered anhydrous aluminum chloride are added to 242 parts of a mixture of acids having an acid value of 216 obtained by the catalytic oxidation of paraffin hydrocarbons. The temperature is kept at 45° C. in order to prevent solidification of the acids. 120 parts of epichlorhydrin are then added. After standing for a short time, the temperature rises to 80° C. and is kept thereat by cooling for a short time. If the reaction does not start by itself, it may be initiated by heating. When the reaction is completed, the acid value has fallen to 8. The aluminum salt is washed out with hydrochloric acid, the unconverted epichlorhydrin and the benzine are removed by distillation under reduced pressure and the unconverted acids removed by treatment with alkalies; the mixture of fatty acid mono-esters of mono-chlorhydrin formed is thus obtained as a pale colored solid mass.

What I claim is:

1. The process of producing fatty acid mono-esters of mono-chlorhydrin, which comprises reacting an aliphatic monocarboxylic acid having at least 4 carbon atoms with epichlorhydrin in the presence of a catalyst of the Friedel-Crafts' type.

2. The process of producing fatty acid mono-esters of mono-chlorhydrin, which comprises reacting an aliphatic monocarboxylic acid having at least 4 carbon atoms at a temperature between about 50° C. and about 100° C. with epichlorhydrin in the presence of a catalyst of the Friedel-Crafts' type.

3. The process of producing fatty acid mono-esters of mono-chlorhydrin, which comprises reacting a mixture of aliphatic monocarboxylic acids each of which has at least 4 carbon atoms with epichlorhydrin in the presence of a catalyst of the Friedel-Crafts' type.

GERHARD STEIN.